United States Patent Office 3,401,174
Patented Sept. 10, 1968

3,401,174
2-ALKYLAMINOBENZIMIDAZOLES
William G. Woods, Fullerton, Harry Goldsmith, Brea, and Robert F. Crawford, La Mirada, Calif., assignors to United States Borax & Chemical Corporation, Los Angeles, Calif., a corporation of Nevada
No Drawing. Original application Aug. 2, 1965, Ser. No. 476,689. Divided and this application Aug. 22, 1967, Ser. No. 662,316
7 Claims. (Cl. 260—309.2)

ABSTRACT OF THE DISCLOSURE 2-dialkylaminobenzimidazoles having halogen, lower alkyl or halo-lower alkyl substituents on the aromatic ring. The compounds are herbicidal and can be formulated to give herbicidal compositions.

---

This application is a division of our copending application Ser. No. 476,689 filed Aug. 2, 1965.

This invention relates to novel substituted benzimidazoles and, more particularly, to novel 2-dialkylaminobenzimidazoles and their use as herbicides.

Benzimidazoles are heterocyclic compounds based on the structure

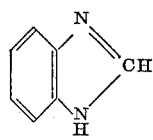

Those benzimidazoles possessing a free imino hydrogen (in the 1-position) are tautomeric systems and the derivatives not possessing a plane of symmetry can exist in two possible tautomeric forms. Thus, the 4- or 5-substituted benzimidazoles can also exist in the 7- or 6-substituted forms, respectively. Therefore, whenever a mono- or polysubstituted benzimidazole not possessing a plane of symmetry is named, it is usually referred to using both positions, as, for example 5(6)-chlorobenzimidazole or 4(7)-chlorobenzimidazole. This system of nomenclature is followed in the following description and claims.

According to the present invention, there are provided novel benzimidazole compounds of the formula

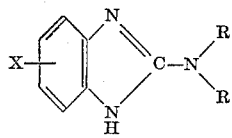

where X represents halogen, a lower alkyl or halo-substituted lower alkyl radical, and R represents a lower alkyl group. Thus, the substituent at the 2-position is a di-lower alkylamino group such as dimethylamino, diethylamino, dipropylamino, N-methyl-N-n-butylamino, and the like. The substituent on the aromatic ring can be a halogen such as chloro, bromo, or fluoro, a lower-alkyl group such as methyl, ethyl, isopropyl, and butyl, or a halo-substituted lower alkyl such as dichloromethyl, 2-chloroethyl, and trifluoromethyl.

The benzimidazoles of the present invention are normally crystalline solids which are soluble in alcohols and in water as the acid salts, such as the hydrochloride salt. The compounds are excellent herbicides when applied as either a pre-emergence or post-emergence treatment and may be formulated with the usual herbicide carriers for use in controlling unwanted plants.

The compounds of this invention are readily prepared by reaction of the corresponding 2-halobenzimidazole, especially the 2-chloro- and 2-bromobenzimidazoles, with the corresponding dialkylamine. Preferably a substantial excess of amine is present in the reaction mixture so as to be available to neutralize the by-product, hydrogen halide, as it is formed. The reaction takes place at an elevated temperature, such as up to about 150° C., and in the case of the gaseous amine reactants is advantageously performed in a sealed system so as to avoid loss of amine reactant. The by-product, amine hydrohalide, can be removed by washing with water and the crystalline product isolated and purified by conventional procedures such as recrystallization.

The reaction can be illustrated by the following equation

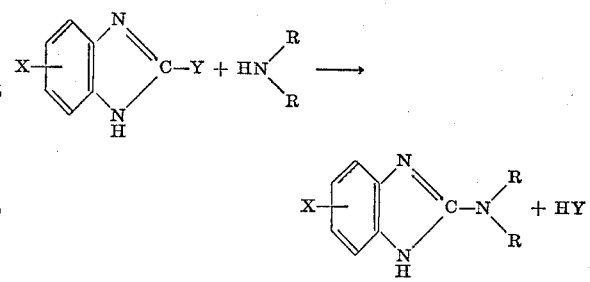

where R and X have the significance previously assigned, and Y represents a reactive halogen, such as bromo or chloro.

The following examples are presented to illustrate the preparation of representative compounds of this invention, but it is to be understood that the invention is not limited to the specific examples given.

Example I.—2-dimethylamino-5(6)-chlorobenzimidazole

A mixture of 18.7 grams (0.1 mole) of 2,5(6)-dichlorobenzimidazole and 56.3 grams of 40% aqueous dimethylamine (0.5 mole) was sealed in a glass tube and shaken at 150° C. for 8 hours. The tube was cooled and opened and the reaction product mixture was transferred to a flask, diluted with water and then brought to pH 10 with concentrated ammonium hydroxide. The precipitated white solid was collected by filtration, washed with water and dried to give 13.5 grams (69% yield) of the desired product, M.P. 234°–239° C.

Example II.—2-dimethylamino-5(6)-methylbenzimidazole

A mixture of 16.7 grams (0.1 mole) of 2-chloro-5(6)-methylbenzimidazole and 56.3 grams of 40% aqueous dimethylamine (0.5 mole) was shaken and heated at 120° C. in a sealed glass tube for 6 hours. The reaction product mixture was poured into 150 ml. of water and the precipitated insoluble product was collected by filtration. After washing with water and drying, the product weighed 11 grams (63% yield) and melted at 233°–238° C.

Example III.—2-diethylamino-5(6)-chlorobenzimidazole

A mixture of 18.7 grams (0.1 mole) of 2,5(6)-dichlorobenzimidazole, 31 ml. (21.9 grams; 0.3 mole) of diethylamine, and 33 ml. of water was sealed in a glass tube and shaken at 150° C. for 2 hours. The reaction product mixture was added to water, which was then treated with ammonium hydroxide to precipitate the insoluble product.

The product was collected by filtration, washed with water, and dried to yield white, crystalline 2-diethylamino-5(6)-chlorobenzimidazole, M.P. 194°–197° C. (softened at 192° C.).

Other compounds embraced by the present invention which can be prepared according to the above-described procedure comprise 2-dimethylamino-5(6)-bromobenzimidazole, 2-dipropylamino-5(6)-fluorobenzimidazole, 2-dimethylamino-5(6)-trifluoromethylbenzimidazole, and 2-(N-methyl-N-ethylamino)-4(7)-chlorobenzimidazole.

The substituted benzimidazoles of this invention are effective herbicidal compounds useful for controlling weed growth. "Weeds" as used herein is intended to include any plant growth which is undesirable. The compounds are useful as a pre-emergence or a post-emergence treatment; that is, they can be used to kill growing plants or they can be used to kill or prevent the emergence of seedlings of the plants. Thus, the compounds can be used to control the growth of weeds by applying a phytotoxic amount to the locus of the weeds, that is, the foliage of the growing weeds or soil in which the weeds are growing or will grow.

An application rate in the range of from about 1 to about 50 pounds of one or more of the active compounds per acre is generally an effective phytotoxic amount, although greater or lesser amounts can be used, if desired. The presently preferred application rate is in the range of from about 5 to about 25 pounds per acre.

The following examples illustrate the herbicidal activity of the representative compounds of this invention.

Example IV 2-dimethylamino-5(6)-cholorobenzimidazole was dissolved in aqueous methanol which had been acidified with hydrochloric acid so as to form the hydrochloride salt of the benzimidazole. The solution was applied as both a pre-emergence and post-emergence treatment to millet, ryegrass, oats, peas, mustard, cucumbers and snap beans at an application rate of 12 pounds per acre. Twenty-seven days after application. a complete kill or non-emergence of all plants was obtained with both the pre-emergence and post-emergence treatment.

Example V 2-dimethylamino-5(6)-chlorobenzimidazole was applied as the hydrochloride salt dissolved in aqueous methanol as a post-emergence treatment to lamb's-quarter, crabgrass, pigweed, mustard, bindweed, water grass, and wild oats. At an application rate of 8 pounds per acre, a substantially complete kill of all plants was obtained after 28 days except for crabgrass, which was severely injured.

Example VI 2-diethylamino-5(6)-chlorobenzimidazole was dissolved in methanol and applied as a pre-emergence treatment to corn, millet, peas, mustard, cucumbers and snap beans. At an application rate of 25 pounds per acre, a complete kill of mustard, cucumbers and snap beans was obtained with no injury to the corn, millet or peas.

Example VII 2-dimethylamino - 5(6) - methylbenzimidazole was dissolved in methanol as the hydrochloride salt and applied as a post-emergence treatment to peas, mustard, cucumbers and snap beans. At an application rate of 7.5 pounds per acre, a substantially complete kill of mustard, cucumbers and snap beans was obtained with slight injury to the peas.

Since a relatively small amount of one or more of the active substituted benzimidazoles should be uniformly distributed over the area to be treated, the compounds preferably are formulated with conventional herbicide carriers, either liquid or solid. Thus, the compounds can be impregnated on or admixed with a solid carrier such as lime, talc, clay, bentonite, calcium chloride, vermiculite, calcium carbonate, and the like. Alternatively, the compounds can be dissolved or suspended in a liquid carrier such as water, kerosene, alcohols, diesel oil, xylene, benzene, glycols and the like. A surfactant preferably is included to aid in dispersion, emulsification and coverage. The surfactant can be ionic or nonionic, and may be liquid or a solid. The use of the term "surfactant" herein is intended to include such compounds commonly referred to as wetting agents, dispersing agents and emulsifying agents. Typical surfactants include the alkylarylsulfonates, the fatty alcohol sulfates, sodium salt of naphthalenesulfonic acid, alkylaryl polyether alcohols, long chain quaternary ammonium compounds, sodium salts of petroleum-derived alkylsulfonic acids, polyoxyethylenesorbitan monolaurate, and the like. These dispersing and wetting agents are sold under numerous trademarks and may either be pure compounds, mixtures of compounds of the same general group, or they may be mixtures of compounds of different classes. Surfactants can also be included in compositions containing a solid inert carrier.

Concentrated compositions containing the active herbicidal agent which can be subsequently diluted, as with water, to the desired concentration for application to plants and soil, are also provided. The advantages of such concentrates are that they are prepared by the manufacturer in a form such that the user need only mix them with a locally available carrier, preferably water, thereby keeping shipping costs to a minimum while providing a product which can be used with a minimum of equipment and effort. Such concentrates may contain from about 5 to about 99 percent by weight of one or more of the active substituted benzimidazoles with a carrier or diluent, which may be a solid or liquid. Liquid carriers which are miscible with the active agent or other liquids in which the compound may be suspended or dispersed may be used. A surfactant is also generally included to facilitate such dilution or dispersion in water. However, the surfactant itself may comprise the carrier in such concentrates.

Since the compounds will form salts with strong acids, such as hydrochloric acid, they can be readily formulated as the salt of the compound in an aqueous solution. This provides a facile method of formulating the compounds since the salts are water-soluble and is preferred for many applications.

The herbicidal compositions can include other beneficial adjuvants, such as humectants, oils and contact agents. Also, other herbicides, such as sodium chlorate and the sodium borates, 2,3,6-trichlorobenzyloxypropanol, the chlorophenoxyacetic acids, trichlorobenzoic acids, substituted ureas, triazines, uracils and carbamates, can be included in the formulations.

Various changes and modifications of the invention can be made and, to the extent that such variations incorporate the spirit of this invention, they are intended to be included within the scope of the appended claims.

We claim:
1. A compound of the formula

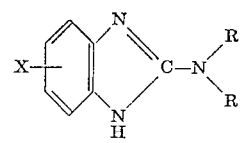

where X is selected from the group consisting of halogen and halo-substituted lower alkyl, and R is lower alkyl.

2. A compound according to claim 1 in the form of its hydrogen chloride salt.

3. A compound according to claim 1 in which said X is chlorine.

4. A compound according to claim 1 in which said X is trifluoromethyl.
5. 2-dimethylamino-5(6)-chlorobenzimidazole.
6. 2-diethylamino-5(6)-chlorobenzimidazole.
7. 2-dimethylamino-5(6)-trifluoromethylbenzimidazole.

References Cited

UNITED STATES PATENTS 3,317,304   5/1967   Goldsmith et al. _____ 71—92
3,317,554   5/1967   Goldsmith et al. _____ 71—92

OTHER REFERENCES

Bishop et al.: Jour. Chem. Soc. (London), 1964, p. 3079 relied on (September 1964).

Efros et al.: Chem. Abst., vol. 48, columns 13686-7 (1954).

Joseph: Jour. Med. Chem., vol. 6, p. 601 (1963).

Pavlov: Chem. Abst., vol. 61, column 2411 (1964, July 20, 1964).

HENRY R. JILES, *Primary Examiner.*

NATALIE TROUSOF, *Assistant Examiner.*